Nov. 19, 1968     MIHAI ALIMANESTIANU     3,411,642
OBJECT STORAGE AND RETRIEVAL FACILITY
Filed Jan. 11, 1967     3 Sheets-Sheet 1
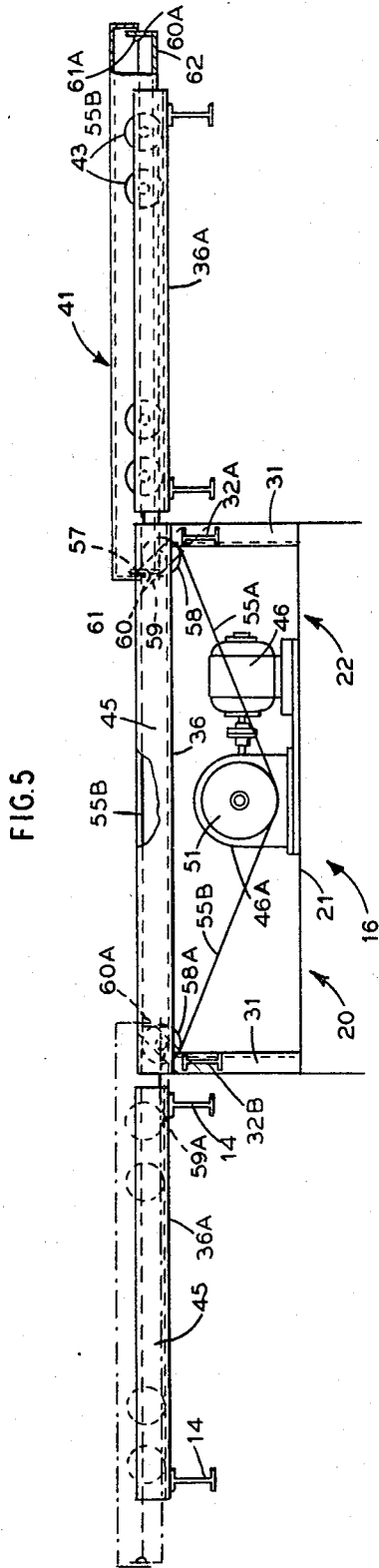
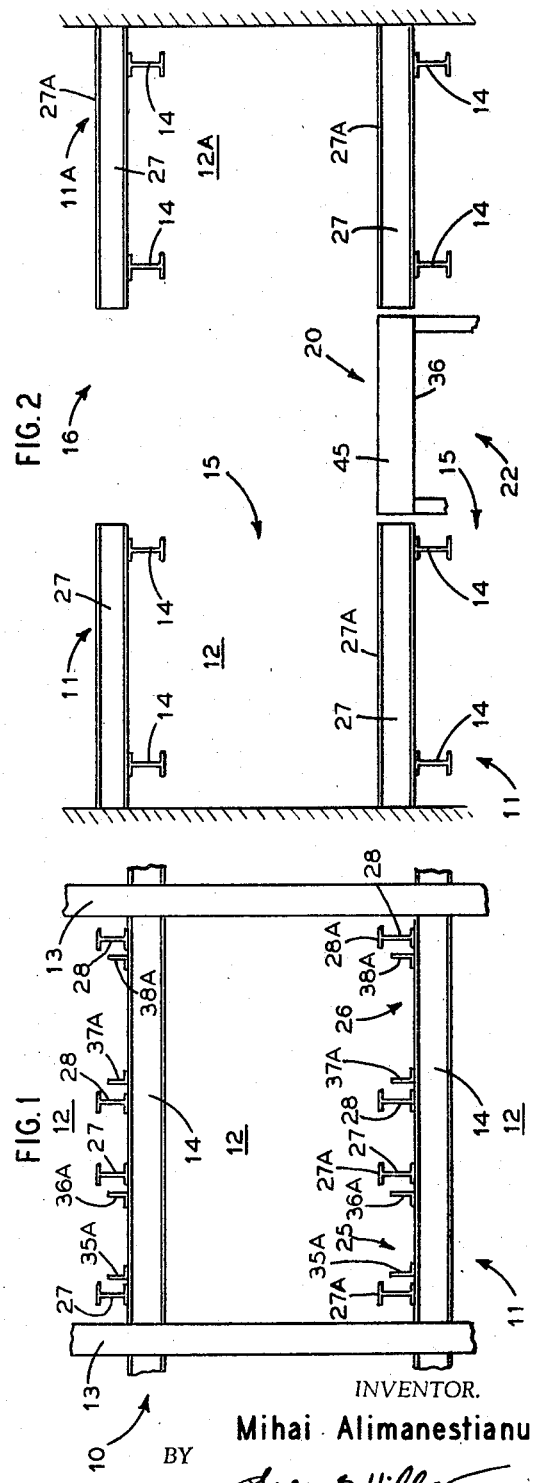
INVENTOR.
Mihai Alimanestianu
BY
Philip S. Hilbert
ATTORNEY

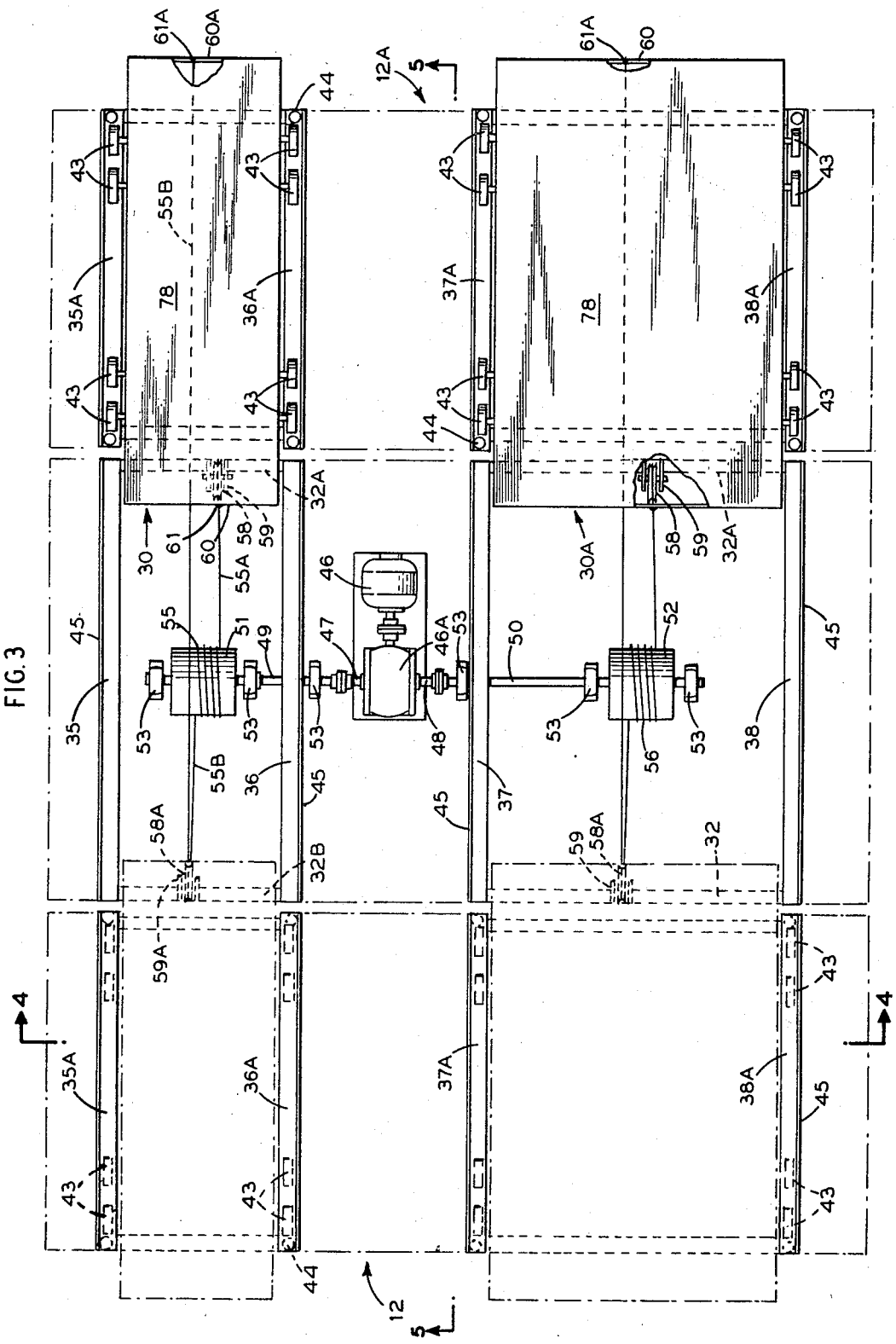

Nov. 19, 1968  MIHAI ALIMANESTIANU  3,411,642
OBJECT STORAGE AND RETRIEVAL FACILITY
Filed Jan. 11, 1967  3 Sheets-Sheet 3

United States Patent Office 3,411,642
Patented Nov. 19, 1968

3,411,642
OBJECT STORAGE AND RETRIEVAL FACILITY
Mihai Alimanestianu, Upper Nyack, N.Y., assignor to Speed-Park, Inc., New York, N.Y., a corporation of New York
Filed Jan. 11, 1967, Ser. No. 608,643
1 Claim. (Cl. 214—16.4)

ABSTRACT OF THE DISCLOSURE

A storage facility of the stall type, having at least two vertical tiers of stalls in opposed relation to each other. Each stall is subdivided into storage zones of different dimensions. An elevator means is movable in the passageway between tiers of stalls. Plural transfer means of dissimilar dimensions are mounted on the elevator means to selectively transfer items between the elevator means and the storage zones of related dimension on either side of the elevator means.

---

This invention relates to a storage and retrieval facility; and more particularly concerns a storage facility having a plurality of stalls, together with transfer means for storing and retrieving objects in and from the several stalls.

Warehouse and storage facilities have undergone substantial changes with the advent of containers, pallets, and skids for packaging objects to be stored. Thus, objects of varying dimensions and weights may be unitized to facilitate handling when the same are being transferred between fixed or movable storage facilities and various incoming and outgoing transportation means associated with the storage facilities, including ships, trains, motor trucks, belt conveyors and the like.

It follows that with the containerization of cargo and the palletizing and skidding of various single objects; facilities for receiving and storing the same must be specifically designed not only the accommodate the stored items, but to be particularly adapted for the specific form of transfer means operating between the storage facility and the transportation means, if maximum efficiency in the storage and transfer operations is to be obtained.

Accordingly, an object of this invention is to provide an improved storage facility of the stall type, together with improved transfer means for use with such storage facility.

Accordingly, an object of this invention is to provide an improved storage facility of the stall type, together with improved transfer means for use with such storage facility.

Another object of this invention is to provide a storage facility of the stall type, wherein the individual stalls of given dimensions are adapted to receive and store one or more cargo containers, skids or pallets; the cumulative dimensions of the stored items not exceeding the dimensions of the individual stalls.

A further object of this invention is to provide an improved storage facility of the character described, wherein the individual stalls may be subdivided into a plurality of laterally related storage zone; each zone being adapted to receive a single item to be stored. Alternatively, a plurality of such storage zones are adapted to receive and store a single item having dimensions greater then the dimensions of any single storage zone.

Still another object of this invention is to provide for use with a stall type storage facility, improved transfer means which is of simple construction, easily fabricated and installed, simple to operate and of relatively low cost.

Yet another object of this invention is to provide improved transfer means of the character described, having a plurality of transfer elements independently operable to permit the selective transfer of individual items on the respective transfer elements, a single large item by way of several transfer elements; the transfer elements being operable to activate or inactivate the same in any desired pattern of transfer operations.

Yet a further object of this invention is to provide a storage facility of the stall type, having at least two vertical tiers of stalls in opposed relation to each other, with transfer means carried in elevator means movable in a transfer passageway betwen the tiers of stalls; the transfer means being operable in opposite directions to selectively transfer items between the elevator means and one of the stalls on either side of the elevator means.

Other objects of this invention will in part be obvious and in part hereinafter pointed out.

In the drawings,

FIG. 1 is a partial front elevational view showing a stall arrangement in a storage facility embodying the invention;

FIG. 2 is a side elevational view thereof;

FIG. 3 is a plan view showing transfer means embodying the invention, in associated relation to the storage facility;

FIG. 5 is a sectional view taken on the line 5—5 of FIG. 3;

Figure 4:
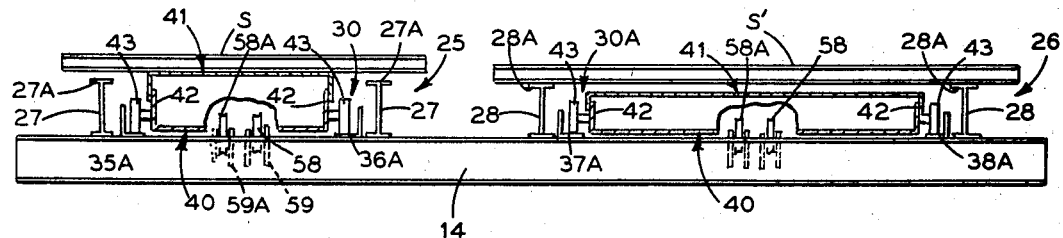
FIG. 4 is a sectional view taken on the line 4—4 of FIG. 3.

Essentially, the instant invention is directed to a combination of storage facility of the open stall type and transfer means, which lends itself to construction with a minimum capital investment, and maximum flexibility in use. The individual stalls of the facility are zoned to allow one or more objects to be stored therein in accordance with the dimensions of the object or objects as related to that of the several zones. Further, improved transfer means includes a plurality of projectible object carrying means correlated to the several storage zones of a given stall to effectively store and retrieve one or more objects in accordance with a programed sequence of operations of the transfer means.

Thus, as shown in the drawings, and particularly, FIGS. 1 and 2, 10 designates a stall type storage facility embodying the invention. The same comprises at least one vertical tier of stalls 11, the individual stalls being indicated at 12. The facility 10 may be of the open frame type, including essentially vertical columns 13 and horizontal girders 14 to define the individual stalls 12 which are fully open on the inner side 15 thereof.

Facility 10 may include a second vertical tier of stalls 11A comprises of individual stalls 12A; the tiers 11, 11A being laterally spaced to provide therebetween a vertical transfer passageway 16. Each stall 12 in tier 11 has a corresponding stall 12A in tier 11A in horizontal alignment therewith; the sides 15 of stalls 12, 12A opening on passageway 16.

Transfer means embodying the invention, generally indicated at 20 is adapted to move in transfer passageway 16 as by mounting the same in a platform 21 of an elevator 22. Elevator 22 is raised and lowered in passageway 16, by conventional means, not shown, so as to align transfer means 20 with a pair of opposed stalls 12, 12A at selected levels in tiers 11, 11A.

The stalls 12, 12A may be of uniform dimensions, and for the purpose of illustration only, may be about 20' long by about 8' in depth and about 10' in height. While stalls 12, 12A may accommodate a single item such as containerized cargo, or palletized or skidded objects; which have flat or substantially flat bottom surfaces; the stalls are subdivided into a plurality of storage zones to receive and store several items in side by side relation.

For the purpose of illustration, stalls 12, 12A are subdivided into two laterally related storage zones 25, 26 which extend to the open side 15 thereof and are of unequal width. The narrower zone 25 is defined by a pair of parallel I beam members 27 having colevel top flange surfaces 27A for receiving and supporting an item to be stored in said zone 25; said beam members 27 being secured to girders 14. Similarly, the wider zone 26 is defined by a pair of parallel I beam members 28, also secured to girders 14 and having colevel top flange surfaces 28A.

Thus, the spacing between members 27 is such as to receive thereon a skid member S carrying an object thereon, not shown, which is to be stored; skid member S resting on support surfaces 27A and having a width of the order of about 7'. Members 28 are spaced to support a skid member S' on surfaces 28A thereof, member S' having a width of the order of about 10' and therefore capable of carrying an object larger than that carried by skid S.

It will be apparent that two objects, not shown, and of different size, may be stored in the respective zones 25, 26 of stalls 12, 12A. Also, one or the other objects may be stored in the appropriate zone 25 or 26; and further, a single object on a skid larger than skids S, S', and capable of spanning adjacent members 27, 28 and extending toward the outer most members 27, 28, may also be stored in combined zones 25, 26. Thus, the zoned arrangement of stalls 12, 12A provides utmost flexibility in the storage of one or more items of varying size.

Transfer means 20 is adapted to carry skids S, S' with objects, not shown, secured thereto, or containerized cargo or palletized items, not shown, which have flat bottom surface portions for transfer to the object supporting beams 27, 28 in stalls 12, 12A. Transfer means 20 comprises a pair of carriages 30, 30A in side by side relation and arranged for horizontal projection into the respective zones 25, 26 of either of stalls 12, 12A and retraction therefrom.

To this end, a frame work made up of vertical posts 31 and horizontal beams 32, is fixed to the top surface of platform 21 of elevator 22. On such framework there is fixed track members in a first pair 35, 36; and a second pair 37, 38 for slidably mounting thereon carriages 30, 30A respectively; the track members being of right angle section.

In each of the stalls 12, 12A there is mounted similar sets of track members 35A, 36A; 37A, 38, which are fixed to girders 14 and located inwardly of beams 27, 28. Said sets of track members 35A, 36A; 37A, 38A, are respectively longitudinally aligned with the track members 35, 36; 37, 38 on platform 21 of elevator 22. The upper flange surfaces 27A, 28A of beams 27, 28 are located above the upper ends of the track members 35–38.

Each carriage 30, 30A comprises a pair of boxlike members 40, 41 arranged in telescoping relation and interconnected for relative movement. The lower carriage member 40 has mounted on the side walls 42 thereof and at the opposite ends thereof, pairs of wheels 43 for movement in track members 35, 36; 37, 38. Guide rollers 44, also mounted on side walls 42 of the lower carriage member 40, bear against the vertical flanges 45 of the track members 35–38, to guide the movement of carriages 30, 30A.

It will be apparent that elevator 22 may be operated to locate platform 21 at a level which will align track members 35–38 with track members 35A–38A in stalls 12, 12A at said level; whereby carriages 30, 30A may be selectively projected into a stall 12 or a stall 12A. Means for effecting movement of the carriages 30, 30A in the selected direction, comprises an electric motor 46 mounted on a central portion of platform 21 between raised track members 36, 37. Motor means 46 is mechanically coupled to a reversible speed reducer 46A having oppositely extending output shafts 47, 48 respectively coupled to drum shafts 49, 50 carrying drums 51, 52 respectively. Shafts 49, 50 are supported on bearing blocks 53 mounted on platform 21.

Steel cables 55, 56 are respectively wrapped about drums 51, 52. Cable 55 has one end portion 55A thereof passing to the right of drum 51, looking at FIG. 5, and thence around a sheave 58 mounted on a bracket 59 fixed to frame member 32A on platform 21. The terminal end of cable portion 55A is fixed to end wall 60 of carriage member 40, as at 61. As drums 51, 52 are located between track members 35, 36; 37, 38 respectively, cable portion 55A extends in a path which is offset relative to the longitudinal medial line between track members 35, 36.

The other end portion 55B of cable 55 passes to the left of drum 51, looking at FIG. 5 and thence around a sheave 58A mounted on a bracket 59A fixed to the frame member 32B on platform 21. The terminal end of cable portion 55B is fixed to end wall 60A of carriage member 40, as at 61A. Cable portion 55B extends in a path on the other side of the longitudinal medial line between track members 35, 36. The bottom wall 62 of carriage member 40 is longitudinally slotted as at 63 to pass sheave 58 and is slotted as at 64 to pass sheave 58A; the end walls 60, 60A being slotted as 63A, 64A to pass cable end portions 55A, 55B.

Thus, upon rotation of drum 51 in a clockwise direction, looking at FIG. 5, cable portion 55A will be wound on drum 51, while cable portion 55B is unwound therefrom, thereby causing carriage 30 to move into stall 12A. Reversal of rotation of drum 51 will cause cable portion 55A to unwind while cable portion 55B is wound on the drum, to move carriage 30 in the opposite direction into stall 12. Carriage 30A operates in an entirely similar manner upon rotation of drum 52 in the selected directions.

Means is provided in each of carriages 30, 30A to effect raised and lowered movement of the upper carriage member 41 relative to lower carriage member 40, so that skids S, S' may be transferred to and from support members 27, 28 in stalls 12, 12A.

Figure 6:
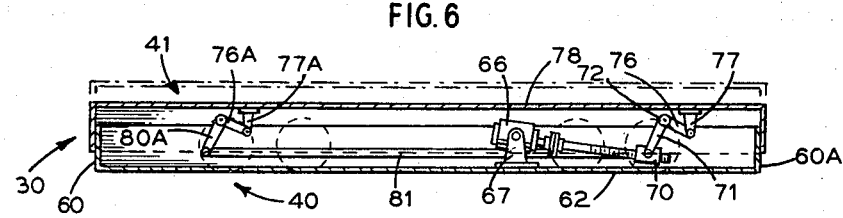
FIG. 6 is an elevational view, with parts in section, showing the raising and lowering means forming part of the transfer means.
Figure 7:
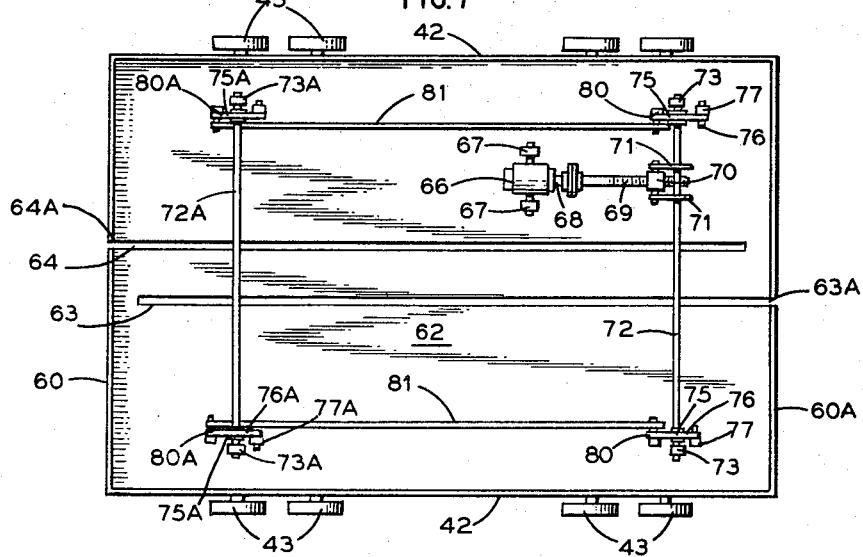
FIG. 7 is a plan view thereof.

To this end, as shown in FIGS. 6, 7; a reversible electric motor 66 is pivotally mounted on the bottom wall 62 of lower carriage member 40 by way of vertical posts 67. The output shaft 68 of motor 66 is coupled to a lead screw 69 carrying a nut 70. A pair of short arms 71 extend from nut 70 and are fixed to a rocker shaft 72 journalled in bearing blocks 73 secured to said carriage wall 62, whereby said shaft 72 is rocked in response to advance and retracted movement of nut 70 as lead screw 69 rotates in one direction or the other.

Bellcrank levers 75 fixed to the opposite ends of rocker shaft 72 have one arm 76 thereof pivotally connected to the lower ends of brackets 77 depending from the top wall 78 of upper carriage member 41, at one end thereof. A second rocker shaft 72A is mounted on bearing blocks 73A secured to carriage bottom wall 62, with bellcrank levers 75A fixed to opposite ends thereof. Lever arms 76A are pivotally connected to the lower ends of brackets 77A depending from top carriage wall 78 at the other end thereof.

The other arms 80 of bellcrank levers 75 are pivotally connected to the other arms 80A of bellcrank levers 75A by links 81, whereby operation of motor 66 in one direction is effective to raise carriage member 41 relative to carriage member 40; and upon operation of said motor in the opposite direction, member 41 is lowered relative to top flange surfaces 27A, 28A at appropriate 78 which carries skids S, S' may be raised or lowered relative to stop flange surfaces 27A, 28A at appropriate points in the projection and retraction of carriages 30, 30A, to transfer said skids S, S' to and from beam members 27, 28.

It is understood that facility 10 may comprise a plurality of tiers 11 of stalls 12 on one side of transfer passageway 16, and a plurality of tiers 11A of stalls 12A on the other side of said passageway; each tier on one side of the passageway being horizontally aligned with a corresponding tier on the other side thereof. In this case, elevator 22 may be arranged for longitudinal movement in passageway 16 to locate said elevator in aligned relation to the selected tiers 11, 11A in a manner known in the art and typically disclosed in applicant's patent No. 3,063,579.

The skids S, S' carrying objects to be stored in facility 10 may be brought to said facility by various transporting means including trucks, trains, conveyor belts, etc., which transport means may be suitably located relative to the facility for initial transfer of said skids S, S' to the carriages 30, 30A.

The thus loaded carriages 30, 30A carried on elevator 22, are brought into alignment with the selected stalls 12, 12A by suitable operation of the elevator. The motors 66 are then energized to raise the upper carriage members 41 to locate the bottom surfaces of the skids S, S' to positions which will clear the beam top flanges 27A, 28A in stalls 12, 12A.

The drums 51, 52 are then rotated in a selected direction to project the carriages 30, 30A into a stall 12 or 12A, followed by operation of the motors 66 to lower carriage members 41 to depressed positions whereby the skids S, S' are transferred to beams 27, 28. The carriages 30, 30A are then retracted to their normal positions on platform 21 of elevator 22 by suitable rotation of drums 51, 52. Retrieval of skids S, S' from stalls 12 or 12A is effected by reversing the mode of operation of carriages 30, 30A, as described above, thereby transferring the storaged skids back to elevator 22 and thence to suitable transportation means.

Thus, two skids S, S' may be simultaneously transferred into or from storage zones 25, 26. However, if but a single skid S or S' is to be stored or retrieved; while both carriages 30, 30A are projected and retracted as described above, the unoccupied carriage is inactivated in respect to the movement of upper carriage 41 thereof by leaving the corresponding motor 66 deenergized. Further, the motors 66 of carriages 30, 30A may be operated in a selected, timed sequence to provide a predetermined pattern of sequential storage and retrieval of skids S, S'.

While, as shown, both carriages 30, 30A are simultaneously projected and retracted; with suitable clutch means, not shown, the drums 51, 52 may be operated independently and in accordance with any desired pattern of operation for programed storage and retrieval of objects relative to stalls 12, 12A.

It will be apparent that a single large skid spanning both carriages 30, 30A may be handled for storage and retrieval by the simultaneous operation of said carriages as described above. Such single skid may rest on beams 27, 28 in the selected stall 12 or 12A.

As various changes might be made in the embodiments of the herein disclosed invention without departing from the spirit thereof, it is understood that all matter herein shown or described, shall be deemed illustrative and not by way of limitation, except as set forth in the appended claim.

What is claimed is:

1. A storage facility comprising at least one section of a plurality of horizontally and vertically disposed stall means for storing objects therein, said stall means being open along one side thereof, each of said stall means being subdivided into a plurality of laterally related storage zones with each zone being accessible from the open side of said stall means, a pair of spaced object support means mounted in each storage zone for receiving and storing an object in said storage zone, the dimension of the space between the pair of object support means in each zone being different relative to the dimension of the object support means in the adjacent zone thereby forming storage zones of different sizes, vertically and horizontally movable transfer means located opposite the open side of said stall means for transferring objects into one of said storage zones and for retrieving the transferred objects, a plurality of carriage means mounted on said transfer means and arranged for alignment respectively with a selected stall and each of said storage zones therein for selective projection and retraction relative to the respective storage zones, the size of the respective carriage means being substantially equal to the size of the aligned storage zone associated therewith, means for projecting each of said carriage means from said transfer means into an aligned storage zone and for retracting said carriage means from said storage zone to said transfer means, said carriage projection and retraction means comprises platform means mounted on said transfer means, two pair of spaced parallel track members on said platform means, a pair of parallel track members in each storage zone of said stall means and respectively longitudinally alignable with a respective pair of track members on said platform means, said track members in each storage zone being laterally spaced relative to said object support means, said carriage means being movable on said longitudinally aligned track members for movement between said transfer means and said storage zones, drum means rotatable about a horizontal axis on said platform means, cable means wrapped about said drum means with the opposite end portions thereof extending in opposite directions from said drum means, first cable guide means on said platform means at one end thereof and between said track members, second cable guide means on said platform means at the other end thereof and between said track members, one of the cable end portions extending from said drum means about the first cable guide means, passing through the length of said carriage means and fixed at the terminal end thereof to one end of said carriage means, the other of said cable end portions extending from said drum means about the second cable guide means, passing the length of said carriage means and fixed at the terminal end thereof to the other end of said carriage means, whereby rotation of said drum means in one direction is operative to project said carriage means to positions beyond one end of said platform means, each carriage means comprising an object carrying member mounted on said platform means and arranged for raised and lowered movement to positions relative to the object support means in a storage zone when said carriage means is projected into said carriage zone whereby an object may be transferred between said object support means and said object carrying member, and means on each of said carriage means for raising and lowering the object carrying member associated with said carriage means.

References Cited

UNITED STATES PATENTS

| | | | |
|---|---|---|---|
| 2,626,718 | 1/1953 | Weber | 214—16.1 |
| 2,752,051 | 6/1956 | Strahm et al. | 214—16.1 |
| 2,817,447 | 12/1957 | Bianca | 214—16.1 |
| 2,901,129 | 8/1959 | Sanders | 214—16.1 |
| 3,219,207 | 11/1965 | Chasar | 214—16.1 |

GERALD M. FORLENZA, *Primary Examiner.*

R. B. JOHNSON, *Assistant Examiner.*